(12) United States Patent
Ariyavisitakul et al.

(10) Patent No.: US 7,551,701 B1
(45) Date of Patent: Jun. 23, 2009

(54) FREQUENCY DOMAIN TRAINING OF PREFILTERS WITH INTERFERENCE SUPPRESSION

(75) Inventors: Sirikiat L. Ariyavisitakul, Alpharetta, GA (US); Manoneet Singh, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 691 days.

(21) Appl. No.: 10/816,781

(22) Filed: Apr. 2, 2004

Related U.S. Application Data

(63) Continuation-in-part of application No. 10/454,421, filed on Jun. 3, 2003, now Pat. No. 7,248,849.

(51) Int. Cl.
*H04B 1/10* (2006.01)
(52) U.S. Cl. ........................ 375/350; 375/233; 375/336; 375/348; 375/355
(58) Field of Classification Search ................. 375/343, 375/347, 147–148, 231–233, 244–246, 262, 375/341, 346, 348–350, 150, 226, 355; 455/101, 455/133
See application file for complete search history.

(56) References Cited

U.S. PATENT DOCUMENTS

| | | | | |
|---|---|---|---|---|
| 6,131,016 | A  * | 10/2000 | Greenstein et al. | 455/69 |
| 6,834,109 | B1 * | 12/2004 | Pare et al. | 379/416 |
| 6,996,380 | B2 * | 2/2006 | Dent | 455/101 |
| 7,254,198 | B1 * | 8/2007 | Manickam et al. | 375/348 |
| 7,321,646 | B2 * | 1/2008 | Arslan et al. | 375/346 |
| 7,327,819 | B2 * | 2/2008 | Lin et al. | 375/375 |
| 2002/0176492 | A1* | 11/2002 | Zangi et al. | 375/233 |
| 2004/0252789 | A1* | 12/2004 | Sundaralingam | 375/336 |
| 2006/0068709 | A1* | 3/2006 | Hafeez | 455/63.1 |

* cited by examiner

*Primary Examiner*—Shuwang Liu
*Assistant Examiner*—Hirdepal Singh
(74) *Attorney, Agent, or Firm*—Steven A. Shaw; W. James Brady; Frederick J. Telecky, Jr.

(57) ABSTRACT

Prefilters for a receiver with multiple input branches are trained in the frequency domain. The frequency response B of a conditioned channel is determined without reference to the prefilters, and the frequency response W of the prefilters is computed from the frequency response B of the conditioned channel. The prefilters suppress interference.

25 Claims, 3 Drawing Sheets

FREQUENCY DOMAIN TRAINING OF PREFILTERS WITH INTERFERENCE SUPPRESSION

CROSS-REFERENCE TO RELATED APPLICATION

This application is a continuation-in-part of U.S. patent application Ser. No. 10/454,421, "Frequency Domain Training of Prefilters for Receivers," by Sirikiat Lek Ariyavisitakul and Manoneet Singh, filed Jun. 3, 2003 now U.S. Pat. No. 7,248,849. The subject matter of the foregoing is incorporated herein by reference in its entirety.

BACKGROUND OF THE INVENTION

1. Field of the Invention

This invention relates generally to the training of prefilters used to process signals received over a communications channel and, more particularly, to the training in the frequency domain of prefilters that perform interference suppression.

2. Description of the Related Art

There is an ever-increasing demand for higher communications data rates, including in wireless systems such as cellular systems and wireless local area networks. However, two effects that can significantly limit the performance of these systems are co-channel interference (CCI) and inter-symbol interference (ISI).

In wireless systems, the cause of CCI is often the re-use of the same radio frequencies in geographically separated cells. For example, a receiver may be tuned to a specific radio frequency in order to receive signals from a transmitter in the same cell that is broadcasting at the specific frequency (i.e., the target transmitter). However, transmitters in adjacent cells may also be transmitting at the same radio frequency and the receiver may also pick up signals from these other transmitters (i.e., interferers). These unwanted signals cause interference at the receiver and, if not suppressed, can significantly limit the performance of communications systems. This is just one example. Interference can also be caused by other phenomena.

In wireless systems, ISI typically is the result of "multipath delay spread," which occurs due to the existence of multiple propagation paths with different delays between the target transmitter and the receiver. In a communications channel with multipath delay spread, a single impulse transmitted from the transmitter does not arrive at the receiver as a single impulse. Rather, it arrives as a series of impulses with different attenuations and delays, with each impulse corresponding to a different propagation path. If the communications channel is characterized by an impulse response h, an h with a longer delay spread typically causes more ISI. Effects other than multipath can also increase the delay spread of h relative to the ideal situation. For example, the presence of transmit filters (e.g., for spectral shaping) and/or receive filtering (e.g., anti-alias/channel select filtering) can also increase the delay spread. Whatever the cause, longer h can limit the performance of the receiver.

In channels with ISI, the maximum likelihood sequence estimator (MLSE) is known to be the optimum (in some sense) detector. However, the complexity of the MLSE, as measured by the number of states in the MLSE trellis, grows exponentially with the length of the delay spread. Specifically, the number of states in the MLSE is given by $M^K$ where M is the size of the modulation alphabets and K is the delay spread of h measured in symbol durations. For communications channels that have a long delay spread, the complexity quickly grows to make the MLSE an impractical alternative. For example, the increased complexity can adversely impact the overall power budget, which is a concern for mobile applications, and/or the price, which is a concern for consumer devices.

One alternative to the MLSE is non-trellis based equalizers, such as the decision feedback equalizer (DFE). These types of equalizers typically do not suffer from the complexity of an MLSE and can produce near-optimum performance for uncoded transmission. However, one drawback of DFEs and other types of non-trellis based equalizers is that they typically generate a hard output, i.e., a final decision that the transmitted bit is either a 0 or a 1. They typically cannot generate a confidence level or probability measure that the transmitted bit is either a 0 or a 1. The latter type of output is sometimes referred to as a soft decision. In systems that use forward error correction (FEC) or other types of encoding, the equalizer or sequence estimator is followed by a decoder. Better decoding performance is achieved when soft decisions are provided to the decoder. Trellis based sequence estimators are believed to be the only known methods for generating reliable soft decisions for decoding. As a result, the use of non-trellis based equalizers with decoders is less than optimal and the problem of reducing MLSE complexity remains an important one.

Prefiltering can reduce the complexity of the MLSE. In this approach, the communications channel is followed by a prefilter in the receiver. Thus, the "effective" communications channel seen by the rest of the receiver is a combination of the communications channel with the prefilter. This combination shall be referred to as the conditioned channel. The prefilter is designed to re-shape or condition the communications channel so that the impulse response of the conditioned channel has a delay spread that is shorter than that of the original communications channel. Since the sequence estimator operates over the conditioned channel rather than over the original communications channel, the complexity of the sequence estimator is reduced accordingly.

Prefiltering can also be used to suppress CCI and other types of interference. In one approach, the receiver has multiple input branches. Each input branch receives the signals transmitted by the target transmitter and by the interfering transmitters. These signals will have different amplitude and phases due to the different paths from each transmitter to each input branch. The signals are combined to form a composite signal, which is processed at the receiver to estimate the original data from the target transmitter. Prefiltering in this situation would ideally filter the received signals on each input branch so as not only to mitigate ISI but also suppress interference from all interfering transmitters. In other words, when the prefiltered signals on various receive branches are combined, the components from the target transmitter reinforce each other while those from the interfering transmitters cancel each other.

The problem of designing (or training) prefilters can be computationally complex, particularly if the prefilter is intended to combat both CCI and ISI. In one approach, the tap weights of the prefilter(s) w and the conditioned channel b are taken as variables that are to be optimized, constraints are imposed on the nature of w and b, and then w and b are jointly optimized relative to some merit function related to CCI and/or ISI.

However, this approach is generally complex since it often involves convolution and w typically is long in order to achieve good performance. For example, gradient-based approaches typically converge too slowly to be useful. Other methods for prefilter training rely on efficient algorithms for solving linear equations, such as the RLS algorithm or Cholesky factorization. However, these methods still require on the order of $L^2$ or $L^3$ computations, where L is the length of b plus the length of w. For the long prefilter lengths that are typically necessary to obtain good performance, these methods are also usually too complex.

Furthermore, in a receiver with multiple receive branches, it is typically necessary to train a branch-specific prefilter for each input branch of the receiver. To make matters worse, for many applications, the communications channel varies over time and the prefilter(s) are trained on an on-going basis to account for varying conditions. For example, in mobile applications where data is transmitted in packets, quick adaptation is desired to compensate for changes due to changing position and packet-to-packet variations in the communications channel. Low complexity for training the prefilters is especially important in these applications.

Thus, there is a need for improved prefiltering methods with low training complexity, particularly approaches that can provide good performance over communications channels with CCI and/or ISI.

SUMMARY OF THE INVENTION

The present invention overcomes the limitations of the prior art by training prefilters in the frequency domain. In one specific application, a receiver has at least two input branches. Each input branch receives signals from a target transmitter and possibly also interference from interfering transmitters (or other sources). Each input branch has a branch-specific prefilter. The frequency response B of the conditioned channel is determined without reference to the branch-specific prefilters, and the frequency responses W of the branch-specific prefilters are computed from the frequency response B of the conditioned channel. B preferably is computed in a non-iterative manner.

This approach for training prefilters is less complex than other approaches. As a result, the prefilters can be made longer in the time domain. This, in turn, makes it simpler to compute the conditioned channel since optimal conditioned channels are known for infinitely long prefilters. For example, using this approach, it is feasible to make a circuit implementation that can achieve a conditioned channel that suppresses interference and has a minimal delay spread of one symbol duration.

Different approaches can be used to compute B. In one approach, the impulse response b is determined and then transformed (e.g., by FFT) to obtain B. In another approach, B is computed from an estimate of responses of the communications channels. Alternately, it can be computed directly from training signals received over the communications channels. The conditioned channel preferably is computed as a linear predictive filter of the residual error after optimum linear equalization. The residual error is the error between (i) the original signal x before transmission across the communications channel; and (ii) the composite signal based on combining the branch-specific signals, assuming that the signals received from each branch have been filtered by a branch-specific equalizer where the collection of branch-specific equalizers collectively form an optimum space-time linear equalizer. The optimum space-time linear equalizer is the collection of branch-specific equalizers that minimizes the mean square value of the residual error. In one particular embodiment, the frequency responses H of the communications channels are used to compute a frequency-dependent SNIR (signal-to-noise-plus-interference ratio), which is used to determine an autocorrelation function v, which is used to compute the impulse response b and then the frequency response B of the conditioned channel.

The prefiltering can also be achieved in a number of ways. For example, the frequency responses W of the prefilters can be computed from the frequency response B of the conditioned channel and from the frequency responses H of the communications channels in order to optimize a preselected performance metric. The prefilters can be applied in the frequency domain or inverse transformed and applied in the time domain.

In one specific application, the prefilters are followed by a sequence estimator and, optionally, also a decoder. The prefilters are applied to the received signal, and the prefiltered signals are combined to form a composite, prefiltered signal. This signal is then processed to estimate the data contained in the signal. For example, a MLSE can be used to generate a soft decision, which is then sent to the decoder. The prefiltering suppresses interference and preferably also shortens the delay spread of the conditioned channel, reducing the complexity of the MLSE. The soft decision can be weighted by a mean square error so that more noisy signals result in less decisive outputs and less noisy signals result in more decisive outputs.

Other aspects of the invention include devices and systems relating to the methods described above.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
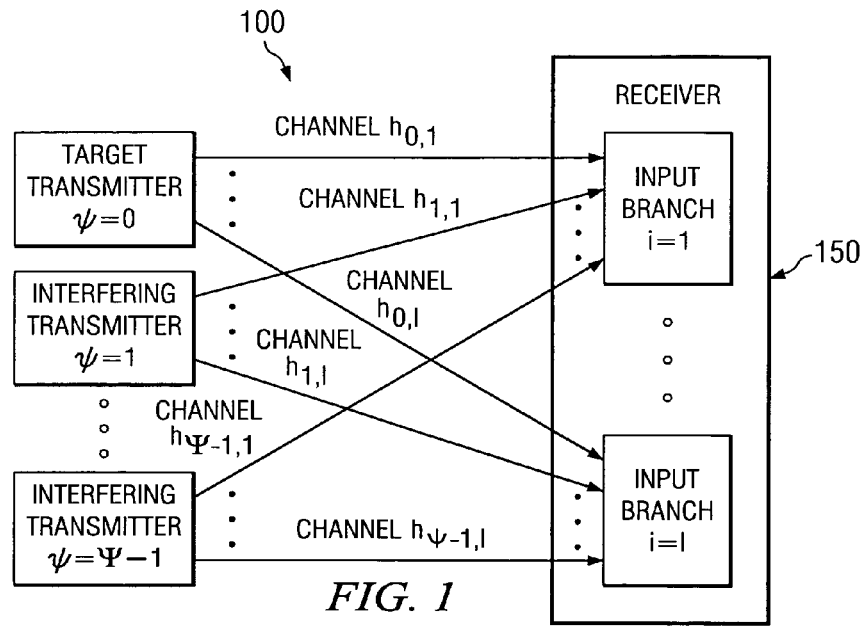
FIG. 1 is a block diagram of a model of a communications system suitable for the present invention.

FIG. 1 is a block diagram of a communications system 100 suitable for the present invention. This example assumes multiple transmitters and spatial diversity. The system 100 includes $\Psi$ transmitters, labeled 0 to $\Psi-1$. Each transmitter generates a signal $x_\psi$. Transmitter 0 is the target transmitter and the receiver 150 attempts to recover the signal $x_0$. The signals from the remaining transmitters, $x_1$ to $x_{\Psi-1}$, are interfering signals. The receiver 150 has I input branches, labeled 1 to I.

Figure 2:
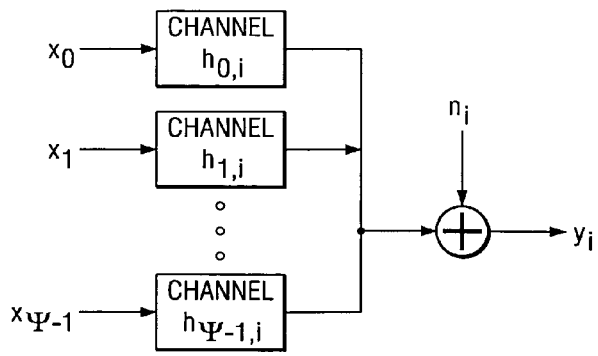
FIG. 2 is a block diagram representing the signal received by one input branch of the receiver of FIG. 1.

The communications channel from each transmitter $\psi$ to each input branch i is modeled by the impulse response $h_{\psi,i}$ and/or the corresponding frequency response $H_{\psi,i}$. The communications channels generally are assumed to be noisy and time-varying. Accordingly, as shown in FIG. 2, the signal $y_i$ received at input branch i can be modeled as $$y_i = \Sigma(x_\psi * h_{\psi,i}) + n_i \qquad (1)$$

where the summation is over all transmitters $\psi$ and $n_i$ is the noise quantity on input branch i, which shall be referred to as the branch-specific noise. The receiver 150 attempts to recover the data contained in $x_0$, based on the received signals $y_i$.

In one application, the system 100 is a wireless system. The transmitted signals x are radio frequency signals that are transmitted through free space (as opposed to some sort of guided wave transmission). The transmitters typically include an antenna for generating the original signals x and the receiver 150 includes an antenna and RF front-end for receiving the signals y. The communications channels may include multipath effects, which lengthen the delay spread of the overall response of the channels. Other effects, such as transmit or receive filtering, can also lengthen the delay spread. The transmitters and receiver 150 may be mobile relative to each other. For example, the transmitters can be fixed base stations and the receiver a mobile handset, or vice versa. The data is organized as packets and various modulation and encoding schemes can be used to convert the data to the transmitted signals x.

While much of the following discussion is in the context of a wireless application, the invention is not limited to this case. For example, it can also be applied to wireline, ADSL and other non-wireless applications. The communications channels can be twisted pair, coaxial cable, optical fiber, or microwave channels, to name a few. The transmitters and receiver 150 may or may not be mobile relative to each other. Different types of noise n and impulse responses h for the communications channels can be accommodated, as well as different types of modulation and/or encoding. Generally speaking, any system where the communications channel 130 suffers from interference and/or has a long delay spread, and a prefilter is used to combat either or both effects, may benefit from the approaches described here. Furthermore, applications that can be mathematically modeled as a communications channel followed by a prefilter may also benefit from these approaches.

Figure 3:
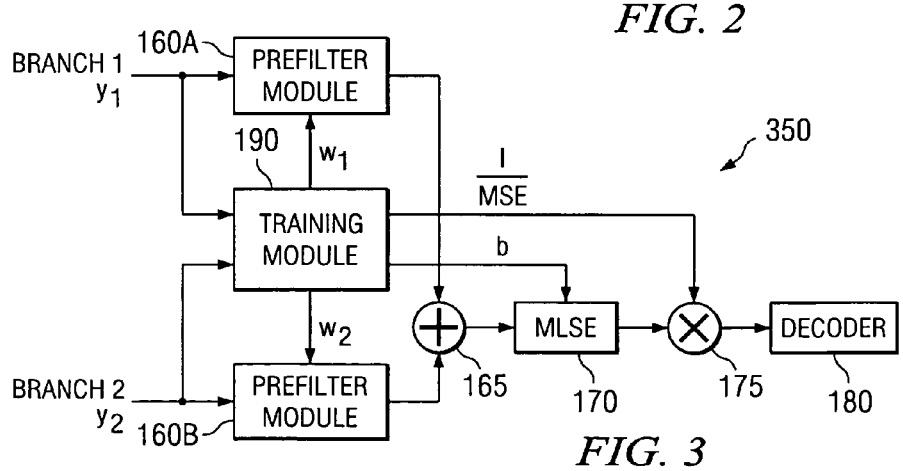
FIG. 3 is a block diagram of a receiver with two input branches, according to the present invention.

FIG. 3 is a block diagram of a receiver 150 according to the present invention. The receiver 150 has multiple input branches. Only two input branches are shown in FIG. 3 for clarity but the basic design can be extended to any number of input branches. For wireless applications, spatial diversity can be achieved by using multiple antennae at the receiver, typically separated by more than half a wavelength. Receiver 150 also includes prefilter modules 160A-B (one for each input branch), a sequence estimator 170 (implemented as a MLSE in this example) and a decoder 180 (e.g., a Viterbi decoder). A summer 165 is coupled between the prefilter modules 160 and the MLSE 170. Multiplier circuitry 175 is coupled between the MLSE 170 and the decoder 180. Receiver 150 also includes a training module 190, which in this example is coupled to receive the incoming signals y and also coupled to provide information to the prefilter modules 160, the MLSE 170 and the multiplier 175.

The receiver 150 operates as follows. The receiver 150 attempts to recover the data contained in $x_0$, based on the received signals $y_i$. Generally speaking, different prefilters are used in each branch, but a single conditioned channel is determined for the receiver in its entirety (i.e., taking into account the combination of signals from the different input branches). The prefilters are used to suppress interference and/or shorten the overall delay spread.

In more detail, the training module 190 receives the signals $y_i$ and determines each of the branch-specific prefilters $w_i$, as well as the overall conditioned channel b and a mean square error metric MSE, as will be described in more detail below. It provides these quantities to the prefilter modules 160, MLSE 170 and multiplier 175, respectively. The received signals are also received by the prefilter modules 160, each of which applies its branch-specific prefilter $w_i$ to its received signal $y_i$. In this implementation, the prefilter module 160 is implemented as a transversal filter, with the tap weights for w received from the training module 190. A summer 165 (or more sophisticated module) combines the prefiltered signals from each branch into a composite prefiltered signal that is sent to the sequence estimator 170.

The MLSE 170 processes the composite prefiltered signal to estimate the data transmitted in the signals y. Rather than making hard decisions about whether a specific bit is a 0 or 1, the MLSE 170 makes a soft decision (i.e., estimates the probability that a specific bit is a 0 or 1) and transmits a confidence level to the decoder 180. In this embodiment, the confidence level is a log-likelihood ratio. That is, it is the log of the ratio of the likelihood that the bit was a 1 to the likelihood that the bit was a 0. A confidence level of zero indicates that the bit was equally likely to be a 0 or a 1, a confidence level greater than zero indicates that the bit was more likely a 1, and a confidence level less than zero indicates that the bit was more likely a 0. Ignoring module 175 for the moment, the confidence levels are passed to decoder 180, which decodes the data stream based in part on the confidence levels. Generally speaking, better decoding performance is achieved when soft decisions are provided to the decoder.

Returning now to module 175, in this example, the confidence levels are weighted by a function of the mean square error before they are used by the decoder 180. In one embodiment, the confidence levels are multiplied by the function 1/MSE where MSE is an error term defined below with respect to FIG. 5. Thus, a large MSE (i.e., large error) results in a small 1/MSE, which in turn reduces the confidence level. Conversely, a small MSE results in a large 1/MSE, which boosts the confidence level. Other functions can be used. In this specific example, the prefilter modules 160 are followed by a sequence estimator 170 and then a decoder 180. In other designs, other modules can follow the prefilter modules 160.

Figure 4:
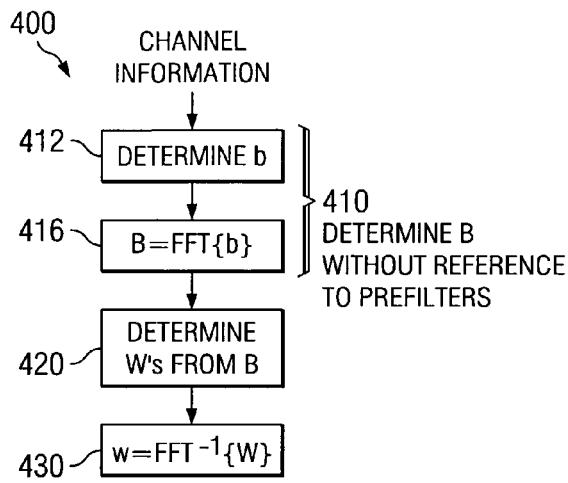
FIG. 4 is a flow diagram illustrating one method of training the prefilters of FIG. 3.

FIG. 4 is a flow diagram illustrating one method 400 of training the prefilters. Method 400 contains two main steps: 410 and 420. In step 410, the training module 190 determines B, the frequency response of the conditioned channel, and it does so without using the prefilters. For example, B is not determined by jointly optimizing b and the w's simultaneously. In step 420, the training module 190 computes the W's, the frequency responses of the prefilters, from B. Preferably, both of these steps are non-iterative.

This approach 400 has lower complexity than more conventional approaches. For example, computing the W's from B in the frequency domain, rather than the time domain, reduces the complexity of the calculation because time-domain convolutions become multiplications in the frequency domain. As a result of this reduced complexity, the prefilters w can be made longer. In contrast, if a conventional, time-domain optimization were used, the prefilters w would be limited in length in order to make the optimization feasible.

Longer w's are an advantage for several reasons. First, longer w's means that b can be shorter. Recall that one goal of the prefilters is to achieve a short delay spread for the conditioned channel b. Second, longer w's mean that b and/or B can be calculated more easily. This is because the optimal b is known for infinitely long w's. The optimal b is the linear predictive filter of a residual error, assuming that optimum space-time linear equalization in the presence of interference has been performed. In more detail, the residual error is the error between (i) the original signal $x_0$ before transmission; and (ii) the composite signal (i.e., the signal sent from the summer 165 to the MLSE 170 in FIG. 3), assuming that the received signal in each branch is filtered by a branch-specific equalizer where the collection of branch-specific equalizers collectively form an optimum space-time linear equalizer. Conventional techniques (e.g., the Levinson-Durbin algorithm) can be used to find the optimal linear predictor of this kind and these techniques typically are significantly less complex than RLS, Cholesky or other alternate methods for prefilter training. When the target length of b is 1 or 2 symbol durations, the computation of b for infinitely long w is especially simple. Therefore, if the w's can be made sufficiently long, the optimal b can be based on the noise predictive filter, which in turn can be computed using conventional, relatively simple techniques.

The rest of FIG. 4 illustrates one specific implementation of the general approach. In steps 412 and 416, the training module 190 determines the impulse response b of the conditioned channel based on information about the communications channels (but without reference to the prefilter) and then transforms b to the frequency domain in order to obtain B. The transformation typically is implemented by the FFT because of its computational efficiency, although other transforms such as the discrete Fourier transform, the analog Fourier transform, the Hartley transform or the Laplace transform can all be used. In step 420, the frequency response of the prefilters W are computed from B and the H's, the frequency responses of the prefilter and the communications channels, respectively. B was computed in step 416. The H's can be obtained by any number of conventional methods. In step 430, the training module 190 inverse transforms the W's to obtain the tap weights w for the prefilters. Again, the FFT is generally preferred.

Figure 5:
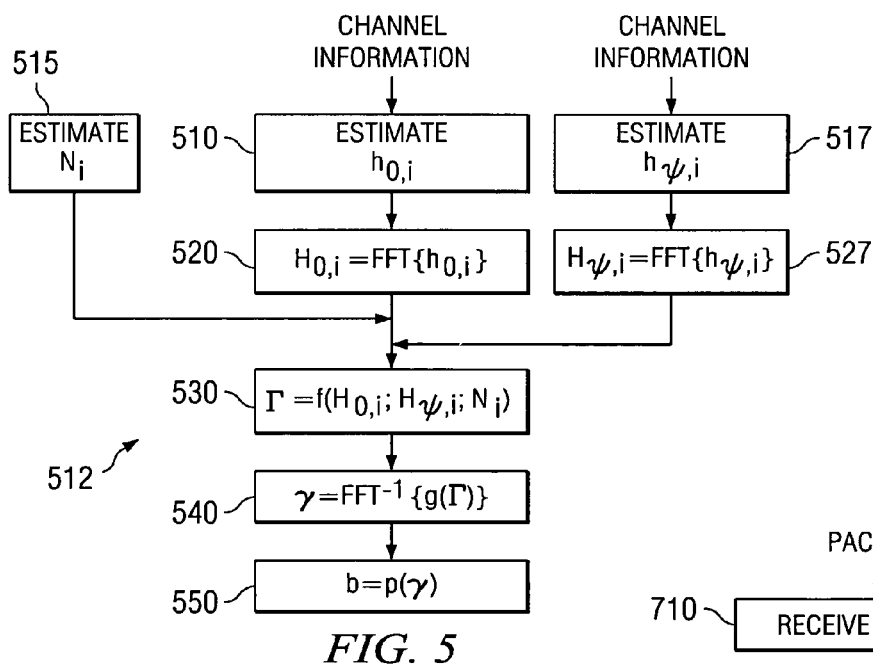
FIG. 5 is a flow diagram illustrating one method of determining the impulse response of the conditioned channel.

FIG. 5 is a flow diagram illustrating one method of determining 412 the impulse response b of the conditioned channel. In this approach, information about the communications channels is used to estimate the impulse responses $h_{\psi,i}$ of the communications channels for the target transmitter (step 510) and for the interferers (step 517). This can be done in a number of ways. For example, a known training signal can be sent across the communications channel for the purpose of modeling the communications channel. Alternately, the communications channel can be modeled based on the actual received signals $y_i$. The frequency responses $H_{\psi,i}$ of the communications channels are obtained by transforming 520, 527 the impulse responses $h_{\psi,i}$, using the FFT in this example. The branch-specific noise density $N_i$ is also estimated 515, which can be accomplished using conventional techniques.

The signal-to-(noise-plus-interference) ratio (SNIR) Γ at different frequencies is computed 530 as a function of the frequency responses H and noise densities N. In one approach, an I×I noise-plus-interference correlation matrix R(l) is defined for each frequency component l. The matrix estimates the correlation of the interference plus noise on each frequency tone. It can be calculated as a sum of the contributions from each interferer plus the noise contribution. The contribution from each interferer ψ can be estimated as $\chi^*_\psi(l)\chi^T_\psi(l)$, where * denotes the complex conjugate and $^T$ denotes the vector transpose. The vector $\chi_\psi(l)$ for interferer ψ is given by $[H_{\psi,1}(l)\ H_{\psi,2}(l)\ldots H_{\psi,I}(l)]^T$. The noise contribution can be estimated as an I×I diagonal matrix, where the diagonal elements are the noise densities $N_1\ N_2\ \ldots\ N_I$. The SNIR can then be estimated as $\Gamma(l)=\chi^T_0(l)R^{-1}(l)\chi^*_0(l)$.

The autocorrelation function ν of the residual error after optimum space-time linear equalization is computed 540 as the inverse transform of a function of the SNIR Γ. The conditioned channel is determined 550 from the autocorrelation function. In this particular case, the autocorrelation function ν is computed as the inverse FFT of $\{1/1+\Gamma\}$. The impulse response b of the conditioned channel is calculated as a predictive filter, given the autocorrelation function ν, using conventional techniques.

Returning to FIG. 4 with this example, in step 416, the impulse response b is transformed to yield the frequency response B. In step 420, a vector of the frequency responses $W_i$ of the branch-specific prefilters is calculated as $[R^{-1}\chi^*_0](B)/(1+\Gamma)$. The frequency responses $W_i$ are inverse transformed 430 to obtain the tap weights $w_i$ of the prefilters. If the MSE is used (for example to weight the soft output of the MLSE, as in FIG. 2), it can be calculated from B and Γ, for example as the average value (over frequencies) of $|B|^2/[1+\Gamma]$.

The specific examples shown in FIGS. 4 and 5 are not the only ways to implement the general approach of steps 410 and 420. For example, if the conditioned channel is assumed to be a specific type of predictive filter, it can be calculated in a number of ways. In one approach, the impulse response b is determined based on a training sequence sent across the communications channel. Alternately, the frequency response B can be determined directly, without first determining the impulse response b.

As another example, step 430 is not required. Prefiltering can be implemented in the frequency domain rather than in the time domain, for example by using spectral factorization. In this case, the impulse responses w of the prefilters are not needed. Rather, the training module 190 provides the frequency responses W to the prefilter modules 160, which then apply the prefilters in the frequency domain.

Figure 6:
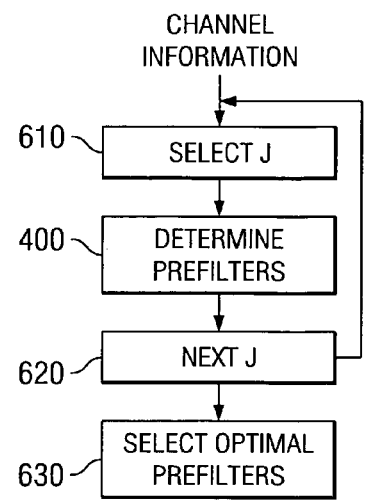
FIG. 6 is a flow diagram illustrating another aspect of training the prefilters of FIG. 3.

FIG. 6 is a flow diagram illustrating another aspect of training prefilters. This flow diagram concerns the delay spread of the conditioned channel. Let J be the delay spread of b, as measured in symbol durations. J is another parameter that can be optimized in the design of a receiver. In one approach, the training module 190 loops 610,620 through different values of J and computes 300 a set of prefilters for each value. The prefilter computation is performed using the methods discussed above. The training module 190 then selects 630 the best set of prefilters.

Alternately, J can be optimized a priori, for example by simulations of the expected communications channel. The training module 190 then computes the prefilters for the given value of J. Generally speaking, smaller J is preferred. Therefore, if J=1 is feasible to implement, then that often will be the default choice. J=1 corresponds to the minimum delay spread of one symbol duration for the conditioned channel.

One advantage of the approaches shown in FIGS. 4 and 5 is that the reduced complexity and basic structure (e.g., the use of FFTs) is well-suited for implementation in dedicated hardware. This can be a significant advantage over other approaches, which may require implementation on general-purpose DSP processors due to their increased complexity. Even if implemented on general-purpose DSP processors, the approaches described above still have significantly lower complexity than other approaches to prefilter training. For example, as a result of the reduced complexity, it is possible to achieve the minimum delay spread of J=1 (one symbol duration) for the conditioned channel where other approaches would be limited to longer delay spreads. This is a significant improvement over other prefilter training methods.

Figure 7:
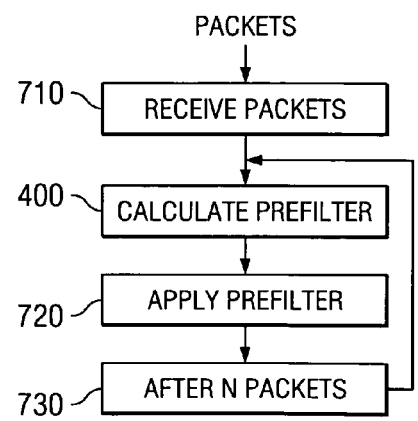
FIG. 7 is a flow diagram illustrating one method of communicating packets using the receiver of FIG. 3.

FIG. 7 is a flow diagram illustrating one method of handling packet communications. In this approach, packets are received 710 and the prefilters are calculated 400 at most once per packet. The same prefilters are applied 720 to the entire packet. The prefilters are recalculated after 730 an integer number of packets. Referring to FIG. 3, if an entire packet experiences the same MSE, then weighting the soft output of the sequence estimator 170 by the MSE does not necessarily assist the decoder 180. However, in many cases, data packets are interleaved and convolutionally encoded, so that a packet received by the receiver 150 actually contains portions of several different data packets. Conversely, a single data packet will be spread over several different packets at the receiver 150. In this case, each portion of the data packet may experience a different MSE and the MSE weighting typically would assist the decoder 180 in reconstructing the entire data packet more reliably.

The receivers described above can be physically implemented in a variety of ways. Generally speaking, different functions have been described as being implemented by different "modules." For example, the prefilter module 160 applies the prefilter to the received signal and the training module 190 determines the various parameters (e.g., b, w's and MSE). The training module 190 itself can be subdivided into other modules, for example one module each for implementing the steps shown in FIGS. 4 and 5. The sequence estimator 170, decoder 180, summer 165 and multiplier 175 are further examples of modules.

The term "module" is not meant to be limited to a specific physical form. Depending on the specific application, modules can be implemented as hardware, firmware, software, and/or combinations of these. In the receiver described above, the modules were implemented as dedicated circuitry (e.g., part of an ASIC), in order to take advantage of lower power consumption and higher speed. In other applications, the modules can be implemented as software, typically running on digital signal processors or even general-purpose processors. Various combinations can also be used. For example, certain operations, like the FFT, inverse FFT, application of a filter, sequence estimation and decoding, may be common enough as to be available as standard components, software, or circuit designs. These may be combined with customized implementations of the remainder of the receiver. Furthermore, different modules can share common components or even be implemented by the same components. There may or may not be a clear boundary between different modules.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components.

The approach described above is also suitable for many applications other than the specific ones described above. For example, prefilters can be used for reasons other than reducing the complexity of the MLSE. Generally speaking, prefilters may be used in any application where it is desirable to reduce the delay spread of the communications channel and/or suppress interference, and the approach described above is generally suitable for these applications.

Figure 8:
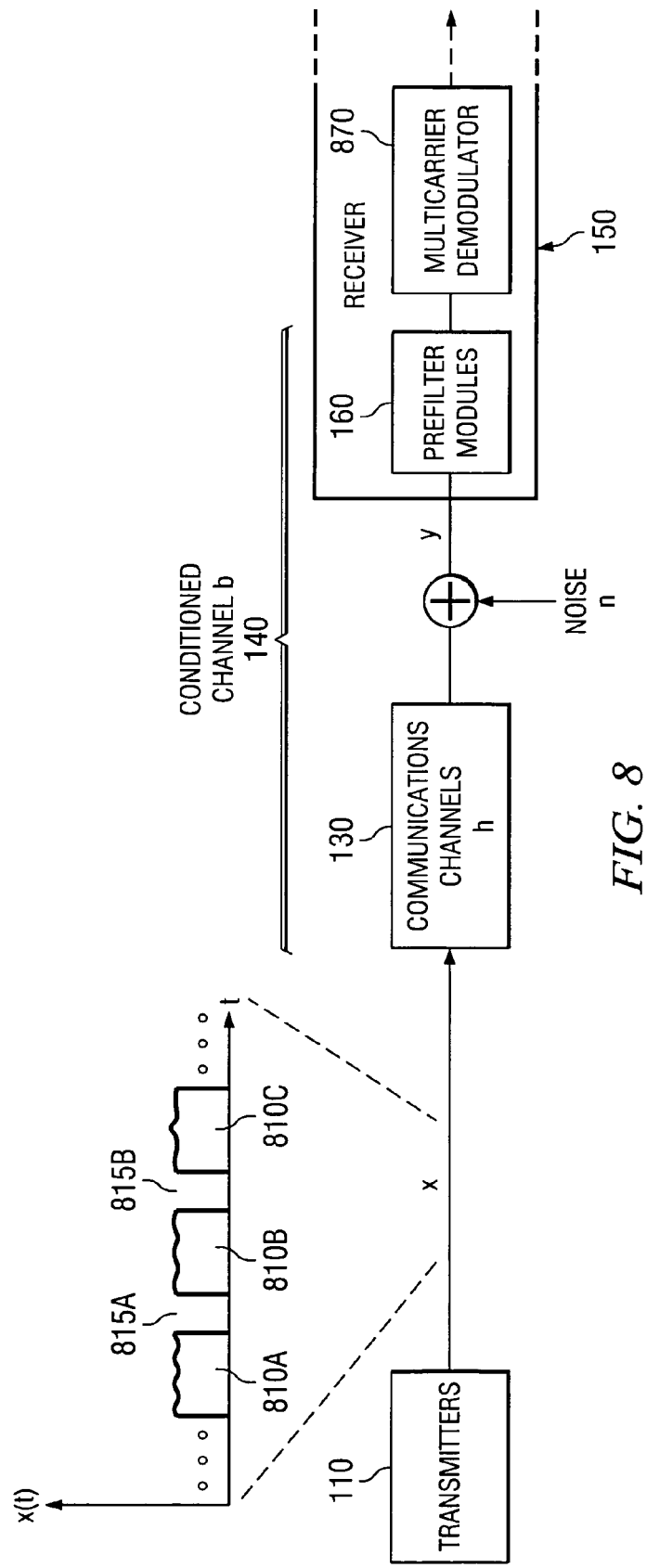
FIG. 8 is a block diagram of a multicarrier communications system suitable for the present invention.

For example, FIG. 8 is a simplified block diagram of a multicarrier (OFDM) system with prefiltering. The multiple input branches for the receiver are not shown for clarity. In these systems, data is transmitted in blocks 810 with a guard interval 815 inserted between successive blocks to prevent ISI from one block to the next. The cyclic prefix, which consists of appending some samples from the end of a block to its beginning, is a common form of guard interval. The guard interval results in a reduction in useful throughput since no new data is transmitted during the guard interval, but it is useful since it assists in maintaining the orthogonality between multicarrier "tones." Ideally, the duration of the guard interval should be larger than the delay spread of the communications channel. However, in some applications, such as those in DSL, the delay spread of the communications channel 130 is relatively long. Using a guard interval that is even longer than the delay spread would result in an unacceptable reduction in data throughput.

However, prefiltering can be used to create a conditioned channel 140 with a delay spread that is shorter than the guard interval. Interference can also be suppressed. In this way, a shorter guard interval can be selected while still maintaining orthogonality between the multicarrier tones. As a result, conventional multicarrier demodulators 870 can be used in the receiver 150. The techniques described above can be used to train the prefilter.

One difference between multicarrier systems and the MLSE example is that in the MLSE example, b is implemented with a sequence estimator that requires b to be causal. In the multicarrier case, b need not be causal. This introduces an additional variable in the optimization—an unknown delay that must also be solved for. Conventional optimization techniques can be used to achieve this. The reduced complexity of the prefilter training described above is especially useful since the optimization over the additional variable may require the repeated calculation of prefilters.

As another example, the above techniques can also be applied to the design of decision feedback equalizers (DFE). A DFE can be modeled as the cascade of a prefilter followed by a sequence estimator, where the sequence estimator is reduced to a symbol-by-symbol hard slicer with feedback. The techniques described above can be used to determine the prefilter. As another example, the prefilter can be viewed as a partial response linear equalizer whose taps are trained in the frequency domain. The partial response characteristic is because the equalizer (i.e., the prefilter) does not completely eliminate ISI. Rather, it is limited to a tolerable level.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A method for training branch-specific prefilters in a receiver having at least two input branches, the input branches receiving branch-specific signals transmitted across communications channels, each branch-specific signal containing data from a target transmitter and possibly also interference, the method comprising:

determining a conditioned channel as a linear predictive filter of a residual error between (i) an original signal before transmission across the communications channels; and (ii) a composite signal that combines the branch-specific received signals after transmission across the communications channels as filtered by one of a plurality of branch-specific equalizers, wherein the plurality of branch-specific equalizers collectively comprise an optimum space-time linear equalizer;

determining a plurality of frequency responses of the communications channels from the transmitters to the input branches;

computing a frequency-dependent signal-to-noise-plus-interference ratio (SNIR) from the plurality of frequency responses of the communications channels;

inverse transforming a function of the frequency-dependent SNIR to obtain an autocorrelation function;

computing an impulse response of the conditioned channel from the autocorrelation function;

transforming the impulse response of the conditioned channel to obtain the frequency response of the conditioned channel; and computing frequency responses of the branch-specific prefilters from the frequency response of the conditioned channel.

2. The method of claim 1 wherein the step of computing a frequency-dependent SNIR from the frequency responses of the communications channels comprises:
  calculating a noise-plus-interference correlation matrix that estimates correlation of interference plus noise; and
  computing the frequency-dependent SNIR from the noise-plus-interference correlation matrix and the frequency responses of the communications channels from the target transmitter to the input branches.

3. The method of claim 1 wherein the step of determining the frequency response of the conditioned channel is non-iterative.

4. The method of claim 1 wherein a delay spread of the conditioned channel is one symbol duration.

5. The method of claim 1 wherein the conditioned channel has a delay spread that is shorter than a delay spread of the effective communications channels from the target transmitter to the input branches.

6. The method of claim 1 further comprising:
  receiving the branch-specific signals transmitted across the communications channels;
  applying the branch-specific prefilters to the received, branch-specific signals; and
  combining the prefiltered, branch-specific signals to generate a composite, prefiltered signal; and
  processing the composite, prefiltered signal to estimate the data from the target transmitter.

7. The method of claim 6 wherein the step of processing the composite, prefiltered signal comprises:
  processing the composite, prefiltered signal according to maximum likelihood sequence estimation.

8. The method of claim 6 wherein the step of processing the composite, prefiltered signal comprises:
  determining a confidence level of the estimate of the data.

9. The method of claim 8 further comprising:
  decoding the estimate of the data, based in part on the confidence level of the estimate.

10. The method of claim 1 wherein the data is transmitted in packets across the communications channels.

11. The method of claim 1 wherein the communications channels are wireless.

12. The method of claim 11 wherein the interference is generated by transmitters that are located in geographically separated cells from the target transmitter but use a same radio frequency as the target transmitter.

13. A receiver for receiving at least two branch-specific signals transmitted across communications channels, each branch-specific signal containing data from a target transmitter and possibly also interference, the receiver comprising:
  a training module comprising:
    a first module for determining a conditioned channel as a linear predictive filter of a residual error between (i) an original signal before transmission across the communications channels; and (ii) a composite signal that combines the branch-specific received signals after transmission across the communications channels as filtered by one of a plurality of branch-specific equalizers, wherein the plurality of branch-specific equalizers collectively comprise an optimum space-time linear equalizer, said first module comprising:
      a module for determining a plurality of frequency responses of the communications channels from the transmitters to the input branches;
      a first computational module for computing a frequency-dependent signal-to-noise-plus-interference ratio (SNIR) from the plurality of frequency responses of the communications channels;
      an inverse FFT for inverse transforming a function of the frequency-dependent SNIR to obtain an autocorrelation function;
      a second computational module for computing an impulse response of the conditioned channel from the autocorrelation function; and
      a second FFT for transforming the impulse response of the conditioned channel to obtain the frequency response of the conditioned channel;
    a second module for computing frequency responses of the branch-specific prefilters from the frequency response of the conditioned channel; and
  prefilter modules coupled to the training module for applying the branch-specific prefilters to the branch-specific received signals.

14. The receiver of claim 13 wherein the first computational module comprises:
  a calculation module for calculating a noise-plus-interference correlation matrix that estimates correlation of interference plus noise; and
  a computational module for computing the frequency-dependent SNIR from the noise-plus-interference correlation matrix and the frequency responses of the communications channels from the target transmitter to the input branches.

15. The receiver of claim 13 wherein the first module determines the frequency response of the conditioned channel in a non-iterative manner.

16. The receiver of claim 13 wherein a delay spread of the conditioned channel is one symbol duration.

17. The receiver of claim 13 wherein the conditioned channel has a delay spread that is shorter than a delay spread of the effective communications channels from the target transmitter to the input branches.

18. The receiver of claim 13 further comprising:
  a sequence estimator coupled to the prefilter modules for combining the prefiltered, branch-specific signals to generate a composite, prefiltered signal; and further for processing the composite, prefiltered signal to estimate the data from the target transmitter.

19. The receiver of claim 18 wherein the sequence estimator comprises a maximum likelihood sequence estimator.

20. The receiver of claim 18 wherein the sequence estimator determines a confidence level of the estimate of the data.

21. The receiver of claim 20 further comprising:
  a decoder coupled to the sequence estimator for decoding the estimate of the data, based in part on the confidence level of the estimate.

22. The receiver of claim 13 further comprising:
  a front-end with at least two input branches.

23. The receiver of claim 13 wherein the data is transmitted in packets across the communications channel.

24. The receiver of claim 13 wherein the training module is adapted for a wireless communications channel.

25. The receiver of claim 13 wherein the training module and the prefilter module are implemented as circuitry on a single integrated circuit.

* * * * *